(12) United States Patent
Kassi Lahlou et al.

(10) Patent No.: US 9,019,965 B2
(45) Date of Patent: Apr. 28, 2015

(54) METHODS AND DEVICES FOR ROUTING DATA PACKETS BETWEEN IPV4 AND IPV6 NETWORKS

(75) Inventors: Mohammed Kassi Lahlou, Fountaine Etoupefour (FR); Jean-Luc Grimault, Mondeville (FR)

(73) Assignee: Orange, Paris (FR)

( * ) Notice: Subject to any disclaimer, the term of this patent is extended or adjusted under 35 U.S.C. 154(b) by 156 days.

(21) Appl. No.: 13/503,070

(22) PCT Filed: Oct. 20, 2010

(86) PCT No.: PCT/FR2010/052229
§ 371 (c)(1),
(2), (4) Date: Apr. 20, 2012

(87) PCT Pub. No.: WO2011/051594
PCT Pub. Date: May 5, 2011

(65) Prior Publication Data
US 2012/0207168 A1    Aug. 16, 2012

(30) Foreign Application Priority Data

Oct. 30, 2009    (FR) .................................. 09 57709

(51) Int. Cl.
*H04L 12/28* (2006.01)
*H04L 12/701* (2013.01)
*H04L 29/12* (2006.01)
*H04L 12/781* (2013.01)

(52) U.S. Cl.
CPC .......... *H04L 45/00* (2013.01); *H04L 29/12358* (2013.01); *H04L 29/12367* (2013.01); *H04L 45/52* (2013.01); *H04L 61/251* (2013.01); *H04L 61/2514* (2013.01)

(58) Field of Classification Search
CPC .................................................. H04L 45/741

USPC .................................. 370/389–392, 401–404
See application file for complete search history.

(56) References Cited

U.S. PATENT DOCUMENTS 7,391,768 B1 * 6/2008 Samprathi et al. ............ 370/389
2001/0040895 A1 * 11/2001 Templin ........................ 370/466

(Continued)

FOREIGN PATENT DOCUMENTS

WO    WO 01/69887 A2    9/2001

OTHER PUBLICATIONS

Jamhour et al., "Global Mobile IPv6 Addressing Using Transition Mechanisms," Proceedings of the 27$^{th}$ Annual IEEE Conference on Local Computer Networks (LCN'02), Nov. 6-8, 2002, Piscataway, NJ, ISA, IEEE, pp. 441-450 (Nov. 6, 2002).

*Primary Examiner* — Chi H Pham
*Assistant Examiner* — Fahmida Chowdhury
(74) *Attorney, Agent, or Firm* — Drinker Biddle & Reath LLP (57) ABSTRACT

A data packet routing system is provided wherein: at least one terminal belonging to a private IPv4 network is connected to a gateway itself connected to an IPv6 network; at least one interface device at the interface between said IPv6 network and a public IPv4 network implements a translation function comprising exchanging a private IPv4 address with a public IPv4 address. The gateway allocates to the terminal an IPv6 address by providing an IPv6 prefix with the private IPv4 address of the terminal in its private IPv4 network; said gateway verifying whether IPv4 address conflict exists, and if IPv4 it does exist, for replacing said private IPv4 address locally with a substitute private IPv4 address. A method is provided that routes an IPv4 data packet sent by a source terminal belonging to a first IPv4 domain via an IPv6 domain to a destination terminal belonging to a second IPv4 domain.

28 Claims, 3 Drawing Sheets (56) References Cited

U.S. PATENT DOCUMENTS

| | | | |
|---|---|---|---|
| 2004/0088385 A1* | 5/2004 | Blanchet et al. | 709/220 |
| 2004/0107287 A1 | 6/2004 | Ananda et al. | |
| 2004/0240468 A1* | 12/2004 | Chin et al. | 370/466 |
| 2006/0146870 A1* | 7/2006 | Harvey et al. | 370/466 |
| 2006/0251088 A1* | 11/2006 | Thubert et al. | 370/401 |
| 2007/0147421 A1* | 6/2007 | Kim | 370/466 |

* cited by examiner

FIG. 1

PRIOR ART

FIG. 2

PRIOR ART

| IPv6 prefix | Public IPv4 address | |

| IPv6 address | | private IPv4 address |
|---|---|---|
| Pref_CPE_ n°456 | 10.23.0.45 | NULL |
| Pref_CPE_ n°3560 | 10.0.99.4 | 192.168.0.45 |
| Pref_CPE_ n°9899 | 10.45.0.4 | 192.168.100.6 |

FIG. 7a

| IPv4 address | comment |
|---|---|
| 10.23.0.45 | originating address |
| 10.0.99.4 | originating address |
| 10.45.0.4 | originating address |
| 192.168.0.45 | substitute address |
| 192.168.100.6 | substitute address |
| 10.120.40.4 | address used by local terminal |
| 10.240.9.44 | address used by local terminal |
| 10.78.0.4 | address used by local terminal |

FIG. 7b

METHODS AND DEVICES FOR ROUTING DATA PACKETS BETWEEN IPV4 AND IPV6 NETWORKS

CROSS-REFERENCE TO RELATED APPLICATIONS

This application is the U.S. national phase of the International Patent Application No. PCT/FR2010/052229 filed Oct. 20, 2010, which claims the benefit of French Application No. 09 57709 filed Oct. 30, 2009, the entire content of which is incorporated herein by reference.

FIELD

The field of the invention is that of a telecommunications network, in particular an Internet protocol (IP) telecommunications network in which data packets are transported from source equipment identified by a source address to destination equipment identified by a destination address.

BACKGROUND

Such a telecommunications network groups together a plurality of pieces of equipment, of links, and of functions dedicated to transporting data issued by terminals connected to the network. In particular, transport functions may be implemented by activating routing and transmission protocols. Below, a telecommunications network administered by an operator is also referred to as a domain.

IP networks include devices that are known as "routers" and that serve to route packets of data to their destinations on the basis of a destination address displayed by each packet received by the router. To do this, the router uses a "routing table" containing "routes", each route being constituted by a prefix (common to a plurality of addresses) or by a complete address (specific route). More precisely, the router determines how it is to route the packet by searching for the longest series of bits that is common to the destination address and to a route mentioned in the routing table.

An Internet service provider (ISP) deploys a dedicated architecture to enable the users of terminals to be reachable. Access to the IP connectivity service is managed by the ISP who relies on the telecommunications network of an operator to route data packets issued by terminals to their final destinations. Under certain circumstances, said service provider is also the operator of the telecommunications network.

Such an ISP allocates an IP address, generally a public address, to a home gateway placed between a home network and the public network, i.e. the operator's IP domain. The home gateway generally allocates private IP addresses to the terminals in its home network.

Below, the term "home gateway" is used to designate any equipment for providing interconnection between a private domain and a domain operated by a service provider, where the private domain may equally well be a home network or a business network. Furthermore, the domain operated by an ISP is also referred to by the term "public network".

Placed as a communications bridge between a terminal of its private domain and the operator's IP domain, the home gateway includes, in known manner, a table in which it associates the private IP address of the terminal in the private domain with a public IP address of the gateway in the public domain. Often, the number of public IP addresses usable by the gateway is much smaller than the number of private IP addresses that are potentially usable by the terminals in the private domain. In a residential context, the gateway almost always has only a single public address available thereto.

More precisely, when converting the header of a data packet leaving the private domain (a private address and a private port are replaced by a public address and a public port), the gateway selects an available public port. Thereafter, for an incoming packet going to said public address and said public port, the gateway knows how to convert the header into a private address and a private port (before relaying the packet to the terminal in question), since it has retained in a table the match between the private address and private port pair with the public address and public port pair. Usage of the public address is thus shared between the terminals of the private domain.

This table is known to the person skilled in the art as the "natting table", which term is derived from the acronym NAT standing for "network address translator". In order to be able to reuse some number of addresses, recourse is usually had to a network address and port translation (NAPT) mechanism. The term "NAT" is sometimes used below for "NAPT", even though not strictly accurate. Furthermore, various types of natting table can be used, in particular tables of the "full cone", "port restricted" or indeed "symmetrical" types.

The conventional version of the IP address system, known as the "IPv4 system" is standardized, in particular on the basis of Internet Engineering Task Force (IETF) document request for comments (RFC) 791.

It is commonly accepted by IP service providers that it is inevitable that public IPv4 addresses will run out.

In order to limit the number of public IPv4 addresses needed for providing an IP connectivity service to a set of clients, proposals have been made and implemented by some operators for a double NAT solution, also known as an "operator NAT" solution. It consists in activating a NAT function within the operator's telecommunications network, in such a manner that the home gateways use a private address in their outward natting tables (instead of a public address). Thus, the "operator NAT" function provides a second level of translation from the private addresses of home gateways to public addresses, thereby enabling a service provider to save a non-negligible number of public IPv4 addresses needed for providing the IP connectivity service.

Nevertheless, that "operator NAT" solution presents several drawbacks, including the following:

the processing of IP data packets is made more complex: by introducing a second level of address and port translation, it is necessary for data packets to be modified twice;

the need to adapt the implementation of conventional application signaling protocols or the application level gateway (ALG), such as the domain name system (DNS), file transfer protocol (FTP), or indeed session initiation protocol (SIP); for example, with SIP, the IP address and the port that are used are specified in SIP signaling, and the corresponding SIP message needs to be modified by the SIP ALG in order to take account of the NAT; although this function can be implemented at the level of a home gateway, it is much too difficult to implement at the level of an operator NAT that federates numerous clients; in a variant, the public address and port currently in use for the terminal need to be communicated to the SIP application; and a deterioration of the IP connectivity service offered by the operator of the public telecommunications network, in particular because functions such as "port forwarding" or DynDNS" are not easily made compatible with the "operator NAT" function.

The document entitled "IPv4 connectivity access in the context of IPv4 address exhaustion: port range based IP architecture" available at the site http://www.ietf.org/internet-drafts/draft-boucadair-port-range-02.txt teaches another solution for delaying the exhaustion of IPv4 addresses. That solution consists in sharing a public IPv4 address between a plurality of pieces of client equipment, with the clients being distinguished from one another when routing data packets having a shared IPv4 address as their destination address, by means of respective port numbers selected from constrained ranges of port numbers, each of which is reserved for a corresponding destination piece of equipment. The data packet is initially routed to a node of the network suitable for routing packets on the basis of the destination address and of the port. The node has a correspondence table associating the pair formed by the shared address and the reserved range of port numbers with a single identifier of the destination equipment. The single identifier, e.g. private IP address, is used for routing the data packet to the destination client equipment.

A first drawback of that solution is that it requires the correspondence between the shared address and the destination equipment identifier to be stored in the node equipment, thereby making it necessary to pass via that node equipment.

Furthermore, the node equipment suitable for processing data packets is generally equipment that is dedicated to processing all of the packets destined for a shared address. The node equipment serves all of the clients in a public address zone. If the unique identifier of the destination equipment is a private IP address or a point-to-point protocol (PPP) session, that requires the node equipment to be situated in a network giving access to the telecommunications network: ISP's have only a limited number of private addresses available to them, and centralizing the node equipment would require complex mechanisms for reusing private addresses between different zones (of the virtual private network (VPN) type). A second drawback of such a solution, once it requires a large number of nodes of this type to be implemented in the telecommunications network (since the nodes must be near to the accesses), is that it involves a large amount of expense for an operator.

Finally, a third drawback of that solution is that it does not enable a data packet to be routed if it does not include the destination port number.

In any event, the above-described solutions can only put off the phenomenon of public IPv4 addresses running out, and cannot prevent it.

In order to solve this problem, the Internet community has taken steps that have led to a new protocol being defined, which is known as Internet protocol version 6 (IPv6). This new version of the IP protocol provides a large number of IPv6 addresses and a hierarchical routing mechanism with improved performance. The same providers are worried by the warnings recently issued by the IETF, in particular in reports presented to the global routing operations working group (GROW) about the risk of IPv4 addresses running out by the end of 2010.

IPv6 addresses are 16 bytes long, i.e. 128 bits, as compared with 4 bytes (32 bits) for IPv4 addresses. The potential number of addresses is thus extremely large compared with the number of IPv4 addresses. An IPv6 address has two parts:
  a left part (the prefix) identifies a subnetwork of the domain; and
  the right part identifies a position machine connected to the subnetwork.

Generally, the longest prefixes allocated to a subnetwork are "/64" prefixes, i.e. they comprise 64 bits. The remaining 64 bits (on the right) of the address are then used to identify a particular machine belonging to the subnetwork. Prefixes of shorter lengths (e.g. /56 or even /48) serve to identify subnetworks of greater size, often themselves having /64 subnetworks. Nevertheless, in the IPv6 standard there is nothing to prevent prefixes being used that are longer than /64, and it is thus possible, for example, to envisage using a /116 prefix that makes it possible to identify a subnetwork capable of containing $2^{12}=4096$ machines (since 128−116=12).

Document RFC 3315 describes a protocol known as the "DHCPv6" protocol that makes it possible in particular for machines situated in a subnetwork to obtain an IPv6 address from a dedicated server known as a "DHCPv6 server".

Furthermore, concerning not a simple IPv6 machine, but rather an IPv6 router or gateway, such equipment must have one (or more) IPv6 prefixes that represent(s) the subnetwork(s) for which the equipment routes data packets.

An extension of DHCPv6 enables a router requesting one (or more) IPv6 prefix(es) to make its request from equipment that is capable of delegating prefixes (typically an upstream router). This extension is described in document RFC 3633 (entitled "IPv6 prefix options for dynamic host configuration protocol (DHCP) version 6"), which specifies an "identity association for prefix delegation option" in DHCPv6 messages for transmitting the delegated prefix(es). Once the requesting router has had one or more IPv6 prefixes delegated thereto, it routes all the IPv6 packets going to or from machines having addresses that include the prefix(es) managed thereby.

Nevertheless, the IPv6 protocol is not yet in widespread practical use by operators, for financial, strategic, and technical reasons associated with managing the complexity of transition and migration operations. The changeover to IPv6 will therefore necessarily give rise to a transition period during which IPv6 domains will need to be capable of interconnecting with IPv4 domains. Unfortunately, there is no provision in present networks for facilitating such interconnection in a manner that is effective and optimized without giving rise to additional states in the network nodes involved in providing the IP connectivity service.

Figure 1:
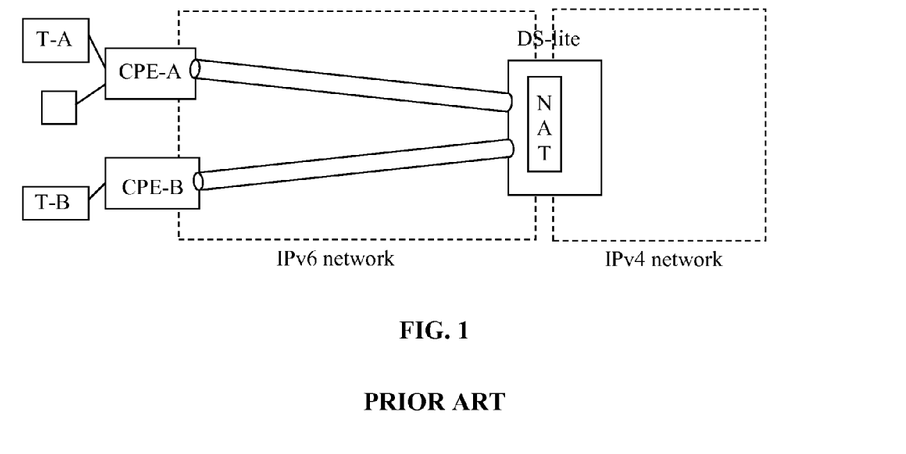
FIG. 1 is a block diagram illustrating a prior art data packet routing system known as "DS-lite"

That is why a so-called "DS-lite" solution to the problem of IPv4/IPv6 interconnection has been proposed in the document entitled "Dual-stack lite broadband deployments post IPv4 exhaustion" that is available on the site http://www.ietf.org/id/draft-ietf-softwire-dual-stack-lite-01.txt (the term "dual stack IP" is used to designate a system suitable for managing both IPv4 addresses and IPv6 addresses). The DS-lite architecture is shown in FIG. 1.

In this architecture, terminals T such as T-A, T-B have respective private IPv4 addresses and are each connected to a customer premise equipment (CPE) gateway. Each CPE gateway is connected to a "DS-lite" node situated at the interface between the IPv6 network and at least one IPv4 network. The CPE gateways and the DS-lite nodes have IPv6 addresses.

A terminal T sends IPv4 packets to the CPE gateway, which packets have the terminal's private IPv4 address as the source address and the other party's public IPv4 address as the destination address. A terminal T receives IPv4 packets from the CPE gateway, which packets have the other party's public IPv4 address as the source address and the terminal's own private IPv4 address as the destination address.

When a CPE gateway receives an IPv4 packet from a terminal T of its local network, it encapsulates the packet in an IPv6 packet with the IPv6 address of the CPE gateway as the source address and the IPv6 address of the DS-lite node to which it is connected as the destination address. Thereafter, it routes the IPv6 packet to the DS-lite node. When a CPE gateway receives an IPv6 packet from the DS-lite node, it extracts the IPv4 packet therefrom and routes the IPv4 packet to the destination address constituted by the private address of a terminal T in its own local network.

When a DS-lite node receives an IPv6 packet from a gateway CPE-A containing an IPv4 packet having the following characteristics:
- issued by a terminal T-A in the local network of the gateway CPE-A;
- source address AdresPrivT-A, source port PortPrivT-A; and
- destined for the public address AdresPubB of a third party B;

then the DS-lite node:
- extracts the IPv4 packet from the IPv6 packet;
- changes the private source address AdresPrivT-A, putting the public address AdresPubA that it has selected for the call in the place of the IPv4 address; and
- changes the source port PortPrivT-A into a source port PortPubA that is available for the address AdresPubA.

These last two operations constitute the above-mentioned NAPT translation function.

Thereafter, the DS-lite node routes the packet as a function of the public IPv4 destination address AdresPubB as follows:

If the address AdresPubB is on the IPv4 network side, then the packet is routed directly to the IPv4 network.

If the address AdresPubB belongs to the pool of public addresses belonging to the DS-lite node itself, i.e. if the destination B is managed by the same DS-lite node via a gateway CPE-B, then the node:
- changes the destination address AdresPubB, putting the private address AdresPrivT-B in its place; and
- changes the destination port PortPubB, putting the destination port PortPrivT-B in its place.

Those last two operations themselves also constitute a NAPT function.

Thereafter, the DS-lite node:
- encapsulates the IPv4 packet in an IPv6 packet with the IPv6 address of the DS-lite node as the source address and the IPv6 address of the gateway CPE-B as the destination address; and
- routes the IPv6 packet to the gateway CPE-B.

When a DS-lite node receives a packet coming from an IPv4 network, the following situations may arise:
- if the destination network forms part of the pool of public addresses of the DS-lite node, that means that the destination of the packet is a terminal T-A of a client A processed by the DS-lite node; in which case the DS-lite node:
  - changes the destination address AdresPubA, replacing it with the private address AdresPrivT-A;
  - changes the destination port PortPubA into PortPrivT-A (NAPT function);
  - encapsulates the IPv4 packet in an IPv6 packet having as its source address the IPv6 address of the DS-lite node and as its destination address the IPv6 address of the gateway CPE-A; and
  - routes the IPv6 packet to the gateway CPE-A;
- otherwise the packet is rejected or routed directly in IPv4.

The above "DS-lite" solution presents the drawback of requiring frequent applications of the NAPT function; it should be understood that these applications are complex.

Figure 2:
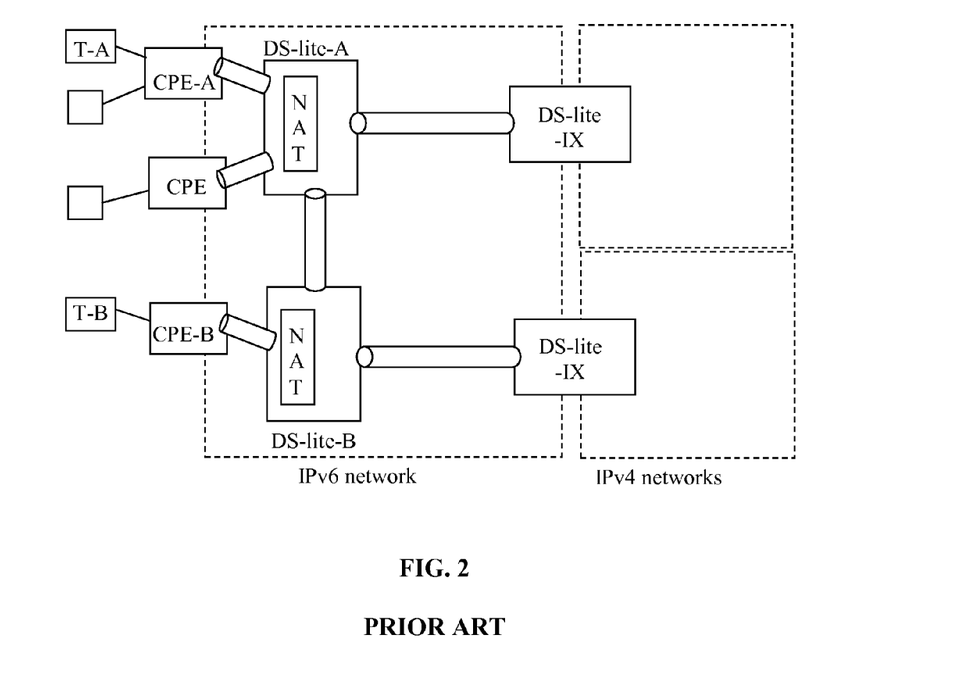
FIG. 2 is a block diagram illustrating another prior art data packet routing system known as "DS-lite-interco"

A variant of the DS-lite solution, known as "DS-lite-interco" is proposed in the document entitled "Deploying dual-stack lite in IPv6-only network" that is available at the site http://www.ietf.org/id/draft-boucadair-dslite-interco-v4v6-02.txt. That solution modifies the "DS-lite" solution described briefly above by separating the NAPT functions from the IPv4/IPv6 interconnection functions, thereby enabling IPv4 traffic encapsulated in IPv6 to be transferred directly between "DS-lite" nodes.

The "DS-lite-interco" architecture is shown in FIG. 2. This architecture has DS-lite nodes situated in an IPv6 network and performing the NAT or NAPT function of changing IPv4 address and port, where appropriate. Furthermore, each DS-lite node is capable of routing IPv6 packets to a "DS-lite-IX" node situated at the interface between the IPv6 network and at least one IPv4 network, where it performs solely the IPv4/IPv6 interconnection function.

Figure 3:
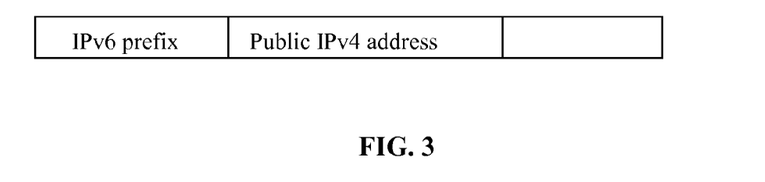
FIG. 3 is a diagram showing an IPv6 address format used in the "DS-lite-interco" system.

Furthermore, the "DS-lite-interco" solution uses IPv6 addresses that are constructed by combining an IPv6 prefix with a public IPv4 address: an address as constructed in this way is referred to below by the terms "public IPv6/IPv4 address". As shown in FIG. 3, this combination may be a mere concatenation. The IPv6 prefix may be a unique prefix (referred to below as "PrefU") such as a prefix defined by the Internet Assigned Numbers Authority (IANA), or a prefix that is specific to a given IPv6 network (e.g. characterizing an ISP).

The operation of the terminals and of the CPE gateways remains unchanged from the operation described briefly above for the DS-lite architecture. In contrast, the DS-lite node and the DS-lite-IX node exchange routing information between one another relating to the IPv4 addresses that belong to them or for which they hold public IPv6/IPv4 addresses.

When a DS-lite node receives an IPv4 packet encapsulated in an IPv6 packet from a gateway CPE-A, it extracts the IPv4 packets therefrom, translates the private IPv4 source address and port into a public IPv4 address and port (NAPT function), and maintains the correspondence between the public and private IPv4 and IPv6 addresses and ports (AdresPrivT-A, PortPrivT-A, AdresPubA, PortPubA, IPv6 address of gateway CPE-A), exactly as in the DS-lite method.

Thereafter, the DS-lite node routes the packet as a function of a public IPv4 destination address AdresPubB as follows:
- if the DS-lite node possesses a public IPv6/IPv4 route (PrefU|AdresPubB) for this address AdresPubB, it encapsulates the IPv4 packet in an IPv6 packet with the public IPv6/IPv4 address (PrefU|source IPv4 address AdresPubA) as the source address and the public IPv6/IPv4 address (PrefU|destination IPv4 address AdresPubB) as the destination address, and it routes the packet to the DS-lite node or DS-lite-IX node concerned;
- if the address AdresPubB belongs to a pool of public addresses of the DS-lite node, operation is the same as in the DS-lite method: the DS-lite node translates the address AdresPubB into the corresponding private IPv4 address and port (NAPT function), encapsulates the IPv4 packet in an IPv6 packet with the IPv6 address of the DS-lite node as the source address and the IPv6 address of the corresponding gateway CPE-B as the destination address. Thereafter, it routes the packet to the gateway in question CPE-B;
- otherwise the packet is rejected.

When a DS-lite node receives an IPv6 packet from another DS-lite node or DS-lite IX node, it routes the packet as a function of the public IPv4 destination address AdresPubB a follows:
- if the address belongs to the pool of public addresses of the DS-lite node, the operation is the same as in the DS-lite method: the DS-lite node extracts the IPv4 packet, translates the address into the corresponding private IPv4 address and port (NAPT function), encapsulates the IPv4 packet in an IPv6 packet and gives the packet the IPv6 address of the DS-lite node as the source address and the IPv6 address of the corresponding CPE gateway as the destination address. Thereafter, it routes the IPv6 packet to the CPE gateway in question;

if the address corresponds to an IPv6 address of another DS-lite node or DS-lite-IX node, the IPv6 packet is routed directly to the DS-lite or DS-lite-IX node in question;

otherwise the packet is rejected.

When a DS-lite-IX node receives an IPv6 packet from a DS-lite or another DS-lite-IX node, it routes it as a function of the public IPv4 destination address as follows:

if the address is on the IPv4 network side, the DS-lite-IX node extracts the IPv4 packet and routes it directly to the IPv4 network;

if the address corresponds to an IPv6 address of a DS-lite node or another DS-lite-IX node, the IPv6 packet is routed directly to the DS-lite node or to the DS-lite-IX node in question;

otherwise the packet is rejected.

When a DS-lite-IX node receives a packet from the IPv4 network, it routes it as a function of the public IPv4 destination address as follows:

if the address corresponds to an IPv6 address of a DS-lite node or another DS-lite-IX node, the IPv4 packet is encapsulated in an IPv6 packet with the public IPv6/IPv4 address (PrefU|source IPv4 public address) as the source address and the public IPv6/IPv4 address (PrefU|destination IPv4 public address) as the destination address, and then it routes this IPv6 packet to the DS-lite node or the DS-lite-IX node in question;

otherwise the packet is rejected or routed directly in IPv4.

Thus, the "DS-lite-interco" solution simplifies packet routing compared with the "DS-lite" solution, but applications of the NAT/NAPT function in the network remain just as frequent, in particular when a terminal T-A is situated in the private network associated with a gateway CPE-A (itself connected to a node DS-lite-A) communicates with a terminal T-B situated in the private network associated with a gateway CPE-B (itself connected to a node DS-lite-B), since under such circumstances both DS-lite devices implement an expensive application of the NAT/NAPT function.

SUMMARY

The present invention therefore provides a method of routing an IPv4 data packet sent by a source terminal belonging to a first IPv4 domain, via an IPv6 domain, to a destination terminal belonging to a second IPv4 domain, said second IPv4 domain being private, said method comprising, on reception of said IPv4 data packet from said source terminal, the following steps:

constructing an IPv6 destination address;

encapsulating the IPv4 data packet, possibly after substituting its IPv4 destination address, in an IPv6 data packet carrying said IPv6 destination address; and routing said IPv6 data packet in said IPv6 domain.

Said method is remarkable in that the IPv6 destination address is constructed by combining an IPv6 prefix and the private IPv4 address of said destination terminal in the second IPv4 domain.

Correspondingly, the invention provides a method of routing an IPv6 data packet resulting from a source terminal belonging to a first IPv4 domain, which first IPv4 domain is private, sending an IPv4 packet, via an IPv6 domain, to a destination terminal belonging to a second IPv4 domain, said method comprising, on reception of said IPv6 data packet, the following steps:

extracting an IPv4 data packet from said IPv6 data packet; and routing said extracted IPv4 data packet, possibly after substituting its IPv4 source address, within the second IPv4 domain.

Said method is remarkable in that the source IPv6 address of the IPv6 data packet is constructed by combining an IPv6 prefix and the private IPv4 address of said source terminal in the first IPv4 domain.

Naturally, said private IPv4 domain may be of any type, such as a home network or a business network. Furthermore, the word "terminal" is used as a generic term for designating any type of computer device, e.g. a personal computer or a server.

By means of the invention, it is possible to save on the use of public IPv4 addresses, while performing significantly fewer complex operations than in the prior art.

In the prior art, a terminal belonging to a private IPv4 network is identifiable by the pair constituted by its private IPv4 address and by the public IPv4 address of the gateway that enables the terminal to access an IPv4 network or an IPv6 network. As described above, this public IPv4 address may, by way of example, be an address that is shared between a plurality of gateways (by allocating a range of different ports to each of the gateways), or a public IPv4 address that has been allocated dynamically and temporarily (together with a port) to the gateway in application of the NAPT function in a DS-lite node.

The inventors take the view that when the gateway is connected to an IPv6 network, and therefore possesses its own IPv6 address, it should be possible to envisage identifying such a terminal by the pair constituted by its private IPv4 address and by the IPv6 prefix of the gateway, in such a manner as to avoid (at least sometimes) the need to allocate a public IPv4 address to the gateway (permanently or temporarily). That is why the invention proposes using IPv6 addresses constructed by combining an IPv6 prefix with a private IPv4 address: below, an address constructed in this way is referred to as a "private IPv6/IPv4 address".

Nevertheless, such a provision raises the problem of complying simultaneously with the standards that are in force that relate to the private IPv4 addresses of such terminals. In particular, since these addresses are allocated locally by each gateway, it can happen that two terminals belonging to two different private IPv4 networks possess the same private IPv4 address. The inventors have observed that if these private addresses are no longer coupled to the public IPv4 addresses of their respective gateways, then within any one private IPv4 network there is a risk of an address conflict, at least when the private IPv4 address of a remote party for an intended communication is already in use by the gateway, either for another remote party for a communication that is ongoing, or for another terminal that is connected to the same gateway. That is why the invention provides a local IPv4 address substitution mechanism for gateways situated between an IPv6 domain and a private IPv4 domain, which mechanism is described in detail below.

An additional advantage of the invention lies in the number of times the NAT/NAPT function needs to be applied. In methods of the prior art such as the DS-lite or DS-lite-interco methods, communications between two gateways constituting a bridge between a private IPv4 network and an IPv6 network route data packets via a "DS-lite" device, and on each occasion that routing requires a NAT/NAPT function to be applied on entering or on leaving the DS-lite device. The invention makes it possible to avoid these expensive applications completely when the data packets, on going from one gateway to another, need to pass only through networks of the IPv6 type (it remains necessary to apply a NAT/NAPT function for data packets that transit from a public IPv4 network to an IPv6 network, or vice versa, with this function then being implemented by an appropriate interface device).

Correspondingly, the invention provides various data packet routing devices.

Thus, the invention firstly provides a device for routing an IPv4 data packet sent by a source terminal belonging to a first IPv4 domain, via an IPv6 domain, to a destination terminal belonging to a second IPv4 domain, said second IPv4 domain being private, said device comprising, on reception of said IPv4 data packet from said source terminal, means for:
  constructing an IPv6 destination address;
  encapsulating the IPv4 data packet, possibly after substituting its IPv4 destination address, in an IPv6 data packet carrying said IPv6 destination address; and
  routing said IPv6 data packet in said IPv6 domain.

Said device is remarkable in that the IPv6 destination address is constructed by combining an IPv6 prefix and the private IPv4 address of said destination terminal in the second IPv4 domain.

According to particular characteristics, said routing device is constituted by an interface device situated between said IPv6 domain and said first IPv4 domain, which IPv4 domain is public, said interface device being suitable for performing said substitution of the destination address of the IPv4 data packet by replacing a public IPv4 address with a private IPv4 address.

According to other particular characteristics, said routing device is constituted by a gateway situated between said IPv6 domain and said first IPv4 domain, which IPv4 domain is private, said gateway being suitable for performing said substitution of the destination address of the IPv4 data packet when there is IPv4 address conflict.

Preferably, said gateway is also suitable for relaying a DNS request that is sent thereto by a terminal connected to the gateway, and after receiving a DNS response, for sending the IPv4 address contained in said DNS response to said terminal, or in the event of an IPv4 address conflict, of sending a substitute private IPv4 address.

By means of these provisions, a terminal situated in a private IPv4 network may, when seeking to communicate with a party for which only a generic address is known (e.g. user@domain.fr), determine the (public or private) IPv4 address of the party so as to insert that address as the destination address in the data packet that the terminal is to send to that party.

In this preferred embodiment, the gateway is thus suitable, on receiving a DNS request from the terminal, for:
  interrogating the DNS server to obtain the IPv4, and where appropriate IPv6, addresses of the party;
  extracting the IPv4 address of the party from the DNS response;
  in the event of an address conflict, implementing the above-mentioned substitution mechanism;
  transmitting to the terminal either the IPv4 address received from the DNS server, or else the substitute address;
  receiving from the terminal data packets for the party and, where appropriate, replacing the substitute IPv4 address in the destination address thereof with the IPv4 address received from the DNS server; and
  encapsulating the IPv4 data packet in an IPv6 packet before sending the packet over the IPv6 network.

It should be observed that the step of the gateway sending an IPv4 address to the terminal can be omitted if the terminal already knows the address as a result of an earlier DNS request.

Secondly, the invention also provides a device for routing an IPv6 data packet resulting from a source terminal belonging to a first IPv4 domain, which first IPv4 domain is private, sending an IPv4 packet, via an IPv6 domain, to a destination terminal belonging to a second IPv4 domain, said device comprising, on reception of said IPv6 data packet, means for:
  extracting an IPv4 data packet from said IPv6 data packet; and
  routing said extracted IPv4 data packet, possibly after substituting its IPv4 source address, within the second IPv4 domain.

Said device is remarkable in that the source IPv6 address of the IPv6 data packet is constructed by combining an IPv6 prefix and the private IPv4 address of said source terminal in the first IPv4 domain.

According to particular characteristics, said routing device is constituted by an interface device situated between said IPv6 domain and said second IPv4 domain, which IPv4 domain is public, said interface device being suitable for performing said substitution of the source address of the IPv4 data packet by replacing a private IPv4 address with a public IPv4 address.

According to other particular characteristics, said routing device is constituted by a gateway situated between said IPv6 domain and said second IPv4 domain, which IPv4 domain is private, said gateway being suitable for performing said substitution of the source address of the IPv4 data packet when there is IPv4 address conflict.

The invention also provides a data packet routing system. The data packet routing system is remarkable in that it comprises a gateway, as described briefly above, connected to an interface device, as described briefly above, via an interposed network access router situated in said IPv6 domain, and in that said network access router is suitable for determining the IPv6 address corresponding to a given public IPv4 address.

By means of these provisions, the routing system can determine the interface device to which the data packets for transiting via a public IPv4 network are to be sent, even when the DNS response sent to the gateway, as described briefly above, does not contain any IPv6 address associated with the party (in which case the DNS response normally contains a public IPv4 address).

Thus, in this embodiment, the access router can route the data packets properly and the gateway can obtain said IPv6 address from the access router if the gateway requests it (when the gateway subsequently needs the IPv6 address to route outgoing data packets).

According to particular characteristics, it is possible for any of the data packet routing devices described briefly above to be embodied in the context of an electronic circuit. By way of example, the electronic circuit may then be constituted by a hard-wired logic chip.

The advantages of these packet routing devices and system are essentially as the same as those of the corresponding methods described briefly above.

Finally, the invention provides a computer program downloadable from a communications network and/or stored on a computer readable medium and/or executable by a microprocessor. The computer program is remarkable in that it includes instructions for implementing the means included in any of the data packet routing devices described briefly above, on being executed by a computer.

The advantages of the computer program are essentially the same as those of said devices.

BRIEF DESCRIPTION OF THE DRAWINGS

Other aspects and advantages of the invention appear on reading the following detailed description of particular embodiments given as non-limiting examples. The description refers to the accompanying drawings, in which.

DETAILED DESCRIPTION

Figure 4:
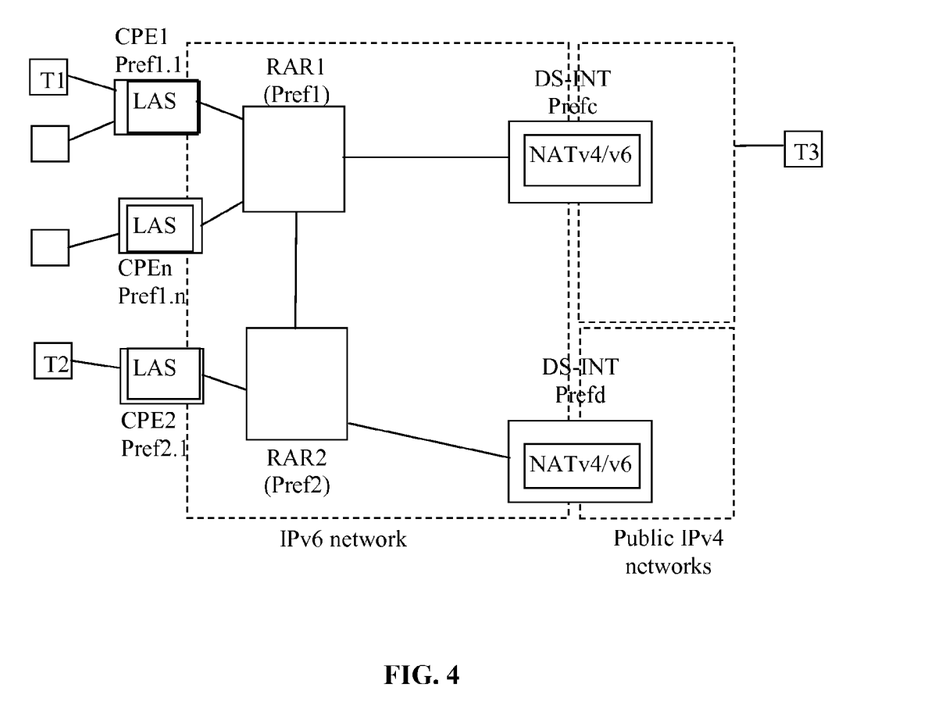
FIG. 4 is a block diagram showing a system for routing data packets in an embodiment of the present invention.

FIG. 4 shows a data packet routing system in an embodiment of the present invention. In this figure, terminals T1 and T2 belong to private IPv4 networks and each of them is connected to a corresponding CPE gateway that possesses its own IPv6 prefix.

In the IPv6 network, each CPE gateway is connected to a network access router (RAR). The prefixes of the CPE gateways connected to the same router are taken under a common prefix referred to as the "network access router level prefix": this is a conventional IPv6 routing principle in which the shorter prefixes allocated to "trunks" (here the network access routers) encompass longer prefixes allocated to "leaves" (here the CPE gateways); for example, if the network access router announces that it is capable of routing a 43-bit prefix (this is the "network access router level prefix"), that gives it the potential of serving 8192 CPE gateways since each gateway has a 56-bit prefix (where: 56−43=13, and $2^{13}$=8192).

The IPv6 network routers, such as RAR1 and RAR2 in FIG. 4, are suitable, in conventional manner, for exchanging routing information between one another.

Finally, at least one interface device DS-INT is situated at the interface between the IPv6 network and a public IPv4 network (behind which there may be other networks, such as an IPv6 network or a private IPv4 network). A terminal T3 is identifiable by means of its public IPv4 address in this public IPv4 network (even if it also possesses a private IPv4 address).

The CPE gateway, the interface device DS-INT, and the network access router are suitable for encapsulating and extracting IPv4 packets within IPv6.

As mentioned above, in the invention, terminals belonging to a private IPv4 network possess respective IPv6 addresses referred to as a "private IPv6/IPv4 address", that are constituted by combining an IPv6 prefix with a private IPv4 address.

Figure 5:
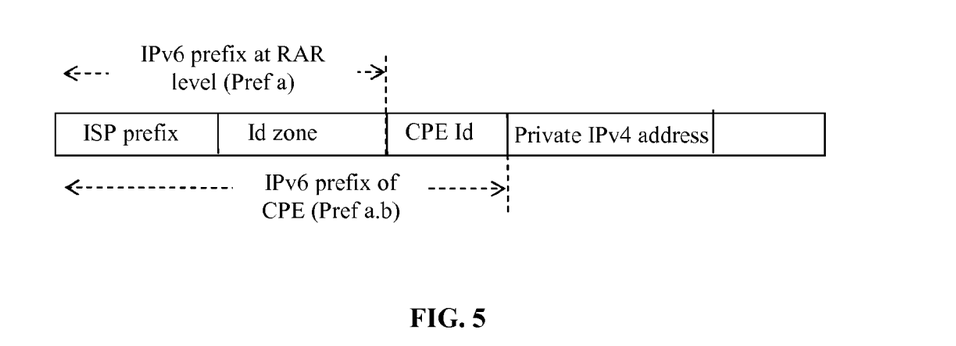
FIG. 5 is a diagram of an IPv6 address format in an implementation of the invention.

In an implementation shown in FIG. 5, the private IPv6/IPv4 address is made up (from left to right) by concatenating the IPv6 prefix of the CPE gateway with the private IPv4 address; the IPv6 prefix of the CPE gateway is itself constituted by concatenating the IPv6 prefix of the network access router serving the CPE gateway with a certain number of bits that characterize the gateway; finally, the IPv6 prefix of the network access router is made up by concatenating the prefix of the ISP with a certain number of bits characterizing the network access router.

The main functions of the system are as follows.

DNS Relay Function

This function is incorporated in the CPE gateways. When a terminal T such as T1 or T2 sends a DNS type request to the gateway to which it is connected (where DNS stands for domain name system), the gateway relays the request. After receiving a DNS reply, the gateway implements the following operations.

If the DNS response contains a private IPv6/IPv4 address, the CPE gateway maintains a correspondence table between the private IPv4 address and the IPv6 address, and then sends the private IPv4 address portion of the DNS response to the terminal T, where appropriate after resolving an address conflict as explained below on the topic of the local address substitution (LAS) function.

If the DNS response is a public IPv4 address, the CPE gateway transmits this public IPv4 address to the terminal T. Under such circumstances, it is necessary to use other techniques to discover the IPv6 prefix of the DS-INT interface in question, such as the "first packet method" explained below, or making use of a specialized server. After discovering the IPv6 prefix, the data packets sent to the DS-INT interface device make use of a public IPv6/IPv4 address, e.g. in the format shown in FIG. 3.

LAS Function

This LAS function (for local address substitution) is also performed by the CPE gateways. In enables the gateway to resolve an address conflict in the event of a remote private IPv4 address already being in use in the CPE gateway:

for a remote party in an ongoing communication (whether this is an original or a substituted address); or for a terminal situated in the local private network associated with the CPE gateway (it should be observed that there can be no address conflict involving public IPv4 addresses since they are unique).

Where appropriate, the address is substituted locally. More precisely, substitution takes place in the following situations:

when a CPE gateway receives a DNS response giving a private IPv6/IPv4 address that is to be used for a communication, the gateway verifies that the IPv4 address contained in the private IPv6/IPv4 address is not already in use by another remote party in an ongoing communication or by a local terminal. If it is already in use, it substitutes the IPv4 address with another IPv4 address that is not already in use in the CPE gateway, and it maintains a correspondence table between the substitute IPv4 address and the private IPv6/IPv4 address. In response to the terminal that sent the DNS request, the CPE gateway sends the substitute IPv4 address; and when a CPE gateway receives an IPv6 packet with a new source private IPv6/IPv4 address, it verifies that the IPv4 address contained in this source private IPv6/IPv4 address is not already in use by another remote party in an ongoing communication or by a local terminal. If it is already in use, it substitutes the IPv4 address with another IPv4 address that is not already in use in the CPE gateway, and it maintains a correspondence table between the substitute IPv4 address and the source private IPv6/IPv4 address.

It should be observed that IPv4 address substitutions are local (i.e. they are known only to the CPE gateway that implements them). In the event that substitution does take place, then the CPE gateway performs the following replacements:

the source IPv4 addresses of incoming packets are replaced by the substitute addresses; and the destination IPv4 addresses of outgoing packets are replaced by the addresses prior to substitution.

If the allocation of addresses to the terminals T1, T2 of an IPv4 private network is performed by the CPE gateway of the private network, then the gateway needs to select the values of the private IPv4 addresses in pseudo-random manner and to verify that they are not already in use as source addresses or as destination addresses in ongoing communications.

This makes it possible to mitigate address conflict situations, even when an address is manually configured in a terminal.

NATv4/v6 Function

This function is necessary solely for a communication with the IPv4 Internet or with any other network that is not part of the IPv6 domain. It is performed by the DS-INT interface devices. Each DS-INT interface device performs translation (NAT function) between public and private IPv4 addresses; where appropriate (i.e. as a function of the implementation selected by network operators), each DS-INT interface device also performs translation (NAPT function) where necessary, between public and private ports. Correspondence between firstly public and private IPv4 addresses and ports, and secondly IPv6 addresses enables data packets to transit between the IPv6 network and IPv4 networks.

Prefix Resolution Function

It is necessary to resolve an IPv6 prefix when the DNS has returned a public IPv4 address to the CPE gateway as the address of the remote party.

Figure 6:
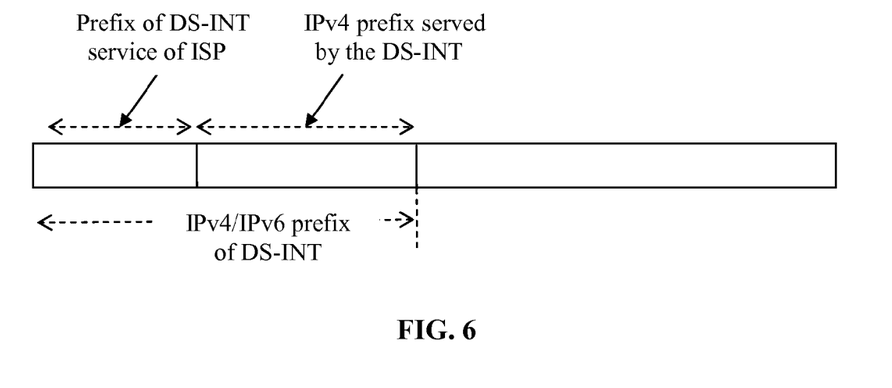
FIG. 6 is a diagram in an implementation of the invention of a prefix characterizing an interface device between an IPv6 network and a public IPv4 network.

In one implementation, as shown in FIG. 6, DS-INT interface devices are given IPv6/IPv4 prefixes that are constructed as follows: the prefix of the DS-INT interface device is constituted by an ISP prefix corresponding to the DS-INT service of the ISP followed by an IPv4 prefix used by the DS-INT interface device for routing data packets to an IPv4 network (e.g. the Internet). A CPE router that sends packets to an IPv4 network interconnected by a DS-INT interface device then needs only to concatenate the "DS-INT service" prefix of the ISP with the public IPv4 address of the remote party in order to obtain the IPv6 destination address to which the encapsulated packets are to be sent.

If the IPv6 network is not suitable for routing data packets on the basis of such public IPv6/IPv4 addresses incorporating a DS-INT IPv6/IPv4 prefix, in another implementation referred to as the "first packet" implementation, routing may be performed as follows: in order to determine the DS-INT prefix corresponding to a public IPv4 address, a router begins by searching in a routing list containing public IPv6/IPv4 addresses for the address having the IPv4 prefix in its longest IPv4 portion that corresponds to the public IPv4 destination address. Once this address has been found, the function extracts the IPv6 prefix and constructs the destination IPv6 address by concatenating the IPv6 prefix it has found with the public IPv4 destination address. In this implementation, it is important that the position of the public IPv4 address bits in the IPv6 address is known to the routers.

Finally, in yet another implementation, as described below, the router by default of the CPE gateway knows the IPv6 prefix of the DS-INT interface device capable of routing the public IPv4 address.

Under all circumstances, once the first return IPv6 packet reaches the CPE gateway, it then knows the IPv6 address of the DS-INT interface device.

Operation of the System

To obtain a more concrete idea, the description below applies to a private IPv6/IPv4 address format in which the IPv6 prefix is merely concatenated with the private IPv4 address.

The description below begins with the steps of a communication between two terminals such as the terminals T1 and T2 of FIG. 4.

When a terminal T1 of private IPv4 address "addressIPv4-1" initiates a communication with a terminal T2 of private IPv4 address "addressIPv4-2", it begins by resolving the address of the terminal T2, unless possibly it has already done that for the purposes of a previous communication. This DNS resolution is relayed by the gateway CPE1 that receives as the DNS response the IPv6 address of T2, i.e.: addressIPv6-2=Pref2.1|addressIPv4-2.

The gateway CPE1 then verifies that the address addressIPv4-2 is not already in use by another remote party in an ongoing communication or by a terminal in its own local network. To do this, it consults a list of IPv4 addresses that are currently in use. This list is made up of the following IPv4 addresses: addresses of local terminals; non-substituted addresses corresponding to the IPv6 addresses of remote parties; and substituted addresses corresponding to the IPv6 addresses of remote parties.

If the address addressIPv4-2 is already in use, the gateway CPE1 replaces it with another value addressIPv4-2\*, maintains in its table the correspondence between the addresses addressIPv4-2\* and addressIPv6-2, and transmits the address addressIPv4-2\* to the terminal T1 as the DNS response. The CPE gateway updates its list of addresses in use by adding thereto the address addressIPv4-2\*.

If the address addressIPv4-2 is not already in use, the gateway CPE1 maintains in its table the correspondence between the addresses addressIPv4-2 and addressIPv6-2, and it transmits the address addressIPv4-2 to the terminal T1. The CPE gateway updates its list of addresses in use by adding thereto the address addressIPv4-2. Merely conserving the address addressIPv6-2 might possibly suffice in this situation, since this address itself contains the address addressIPv4-2.

When the gateway CPE1 receives an IPv4 packet from the terminal T1 with as its destination address DAv4=addressIPv4-2 or addressIPv4-2\*, and as its source address SAv4=addressIPv4-1, it implements the following operations:

if DAv4=addressIPv4-2, it encapsulates the IPv4 packet in an IPv6 packet with a destination address DAv6=Pref2.1|addressIPv4-2 and a source address SAv6=Pref1.1|addressIPv4-1, and it routes the packet to the destination gateway CPE2 in native IPv6; or if DAv4=addressIPv4-2\*, it begins by substituting the address addressIPv4-2\* with the address addressIPv4-2 in the IPv4 packet, it encapsulates the packet in an IPv6 packet with a destination address DAv6=Pref2.1|addressIPv4-2, and a source address SAv6=Pref1.1|addressIPv4-1, and it routes the packet to the destination gateway CPE2 in native IPv6.

When the gateway CPE2 receives the IPv6 packet with the destination address DAv6=Pref2.1|addressIPv4-2 and source address SAv6=Pref1.1|addressIPv4-1, it implements the following operations:

if the address IPv4-1 is already in use, the gateway CPE2 substitutes it with another value addressIPv4-1*, maintains in its table the correspondence between the addresses addressIPv4-1* and addressIPv6-1, replaces the address addressIPv4-1 by the address addressIPv4-1* in the IPv4 packet, and relays the packet to the terminal T2. The CPE gateway updates its list of addresses in use by adding thereto the address addressIPv4-1*; or if the address IPv4-1 is not already in use, the gateway CPE2 maintains in its table the correspondence between addressIPv4-1 and addressIPv6-1, and relays the IPv4 packet to the terminal T2. The CPE gateway updates its list of addresses in use by adding thereto the address addressIPv4-1. Merely conserving the address addressIPv6-1 might possibly suffice in this situation, since it already contains the addressIPv4-1.

There follows, secondly, a description of the steps of a communication between two terminals such as the terminals T1 and T3 of FIG. 4.

When the terminal T1 of private IPv4 address addressIPv4-1 initiates a communication with a terminal T3 of public address addressIPv4-3, it generally begins by resolving the address of the terminal T3. This DNS resolution is relayed by the gateway CPE1 which receives in response the public IPv4 address "addressIPv4-3" from the terminal T3. The gateway CPE1 then relays the address addressIPv4-3 to the terminal T1 in response to its DNS request.

Since the gateway CPE1 does not have a prefix corresponding to the public IPv4 address addressIPv4-3, it needs to discover the IPv6 prefix of the DS-INT interface device that connects the IPv6 network to the public IPv4 network in question. This discovery may be performed using the following method.

When the gateway CPE1 receives an IPv4 packet from the terminal T1 that has a source address SAv4=addressIPv4-1 and a destination address DAv4=addressIPv4-3 for which it does not have the corresponding IPv6 prefix, it encapsulates the packet for sending to a default router (e.g. the access router) in an IPv6 packet with a destination address DAv6=addressIPv6 of the default router and a source address SAv6=Pref1.1|addressIPv4-1.

The router by default receives the IPv6 packet, extracts the IPv4 packet, and then:
  determines the IPv6 prefix of the DS-INT interface device corresponding to the IPv4-3 address (prefix Prefc in this example);
  encapsulates the IPv4 packet in an IPv6 packet with a destination address DAv6=Prefc|addressIPv4-3 and a source address SAv6=Pref1.1|addressIPv4-1; and
  routes the IPv6 packet to its destination DS-INT interface device.

More precisely, in order to determine the IPv6 prefix of the DS-INT interface device corresponding to the public address IPv4-3, the default router begins by searching in its routing table for the IPv6 route that has the longest IPv4 prefix corresponding to the public IPv4 destination address. Once this route has been found, it extracts the IPv6 prefix and constructs the destination IPv6 address by concatenating the IPv6 prefix it has found with the public IPv4 destination address.

When a DS-INT interface device receives an IPv4 packet encapsulated in an IPv6 packet with a destination address DAv6=Prefc|addressIPv4-3 (where the addressIPv4-3 is a public IPv4 address) and a source address SAv6=Pref1.1|addressIPv4-1 (where the addressIPv4-1 is a private IPv4 address), the DS-INT interface device:
  extracts the IPv4 packet;
  translates the source private address addressIPv4-1 into a public IPv4 address addressIPv4-1P;
  selects a free port portPub for this public address;
  maintains in its table the correspondence between the addresses addressIPv4-1P, portPub, SAv6, and private port; and
  routes the IPv4 packet to its destination.

When a DS-INT interface device receives an IPv4 packet with a public address as its destination address DAv4=addressIPv4-2P, a destination port portPub, and a public address as its source address SAv4=addressIPv4-3, then the DS-INT interface device:
  translates the public address addressIPv4-2P and the port portPub into the corresponding private address addressIPv4-2 and the port portPub into the corresponding private port;
  encapsulates the packet in an IPv6 packet with a destination address DAv6=Pref2.1|addressIPv4-2, and a source address SAv6=PrefC|addressIPv4-3; and
  routes the packet directly to the gateway CPE2.

When the gateway CPE2 receives the IPv6 packet with the destination address DAv6=Pref2.1|addressIPv4-2 and the source address SAv6=PrefC|addressIPv4-3, the gateway CPE2:
  registers in its table, if this has not already been done, the correspondence between the address addressIPv4-3 and the prefix Prefc (or the address SAv6);
  extracts the IPv4 packet; and
  routes the packet to its destination, i.e. the terminal T2 of address addressIPv4-2.

In principle, there ought not to be any address conflicts, since the address IPv4-3 is a public address. However, if necessary (e.g. as a result of an address being corrected that does not comply with an IPv4 address standard, such as RFC 791), it is possible to call on the above-described LAS function.

Thereafter, in order to send packets to the address IPv4-3, the gateway CPE2 encapsulates directly to the DS-INT interface device in question, since it knows the prefix Prefc.

Figure 7A:
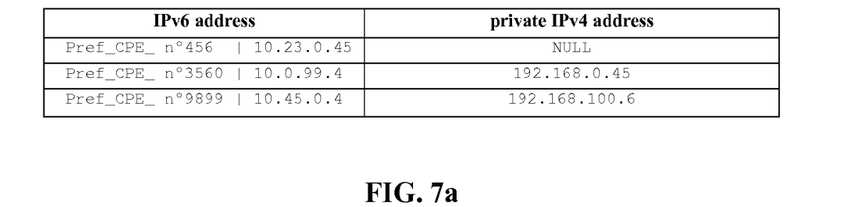
FIGS. 7a and 7b show an example of a correspondence table and a list of addresses in use, in an implementation of the invention.

An example of a correspondence table associated with a gateway is shown in FIG. 7a. In this table, the left-hand column contains the IPv6 addresses of remote parties, and the right-hand column contains in correspondence therewith the private IPv4 addresses used to identify the parties within the private domain associated with the gateway. The term "NULL" in the right-hand column indicates that the corresponding IPv4 address (i.e. the right-hand portion of the corresponding IPv6 address) has not been substituted.

Figure 7B:
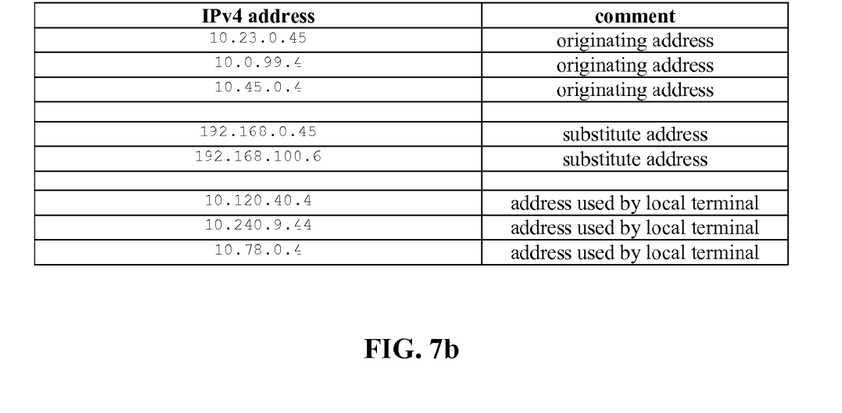

An example of the list of IPv4 addresses in use that is associated with a gateway is shown in FIG. 7b, or more exactly in the left-hand column of this figure. The right-hand column of the figure indicates whether the corresponding address is the originating address of a remote party or a substitution address for a remote party, or indeed an address used by a terminal belonging to the private network associated with the gateway.

As mentioned above, the present invention also relates to a computer system actuating any of the above-described data packet routing devices. The computer system comprises in conventional manner a central processor unit using signals to control a memory, and also an input unit and an output unit.

Furthermore, the computer system may be used to execute a computer program including instructions for actuating any of the above-described data packet routing devices.

The invention also applies to a computer program downloadable from a communications network and including instructions for implementing means included in any of the data packet routing devices of the invention, on being executed on a computer. The computer program may be stored on a computer readable medium and may be suitable for executing on a microprocessor.

The computer program may use any programming language, and may be in the form of source code, object code, or code that is intermediate between source code and object code, such as in a partially-compiled form, or in any other desirable form.

The invention also relates to a computer readable data medium that includes instructions of a computer program as mentioned above.

The data medium may be any entity or device capable of storing the program. For example, the medium may comprise storage means such as a read-only memory (ROM), e.g. a compact disk (CD) ROM, or a microelectronic circuit ROM, or indeed magnetic recording means, e.g. a hard disk or a universal serial bus (USB) flash drive.

Furthermore, the data medium may be a transmissible medium such as an electrical or optical signal, that may be conveyed via an electrical or optical cable, by radio, or by other means. The computer program of the invention may in particular be downloaded from a network of the Internet type.

In a variant, the data medium may be an integrated circuit in which the computer program is incorporated, the circuit being adapted to execute or to be used in the execution of a computer program.

The invention claimed is:

1. A method of routing an IPv4 data packet sent by a source terminal belonging to a first IPv4 domain, via an IPv6 domain, to a destination terminal belonging to a second IPv4 domain, said second IPv4 domain being private, said method comprising, on reception of said IPv4 data packet from said source terminal:
    constructing an IPv6 destination address;
    encapsulating the IPv4 data packet in an IPv6 data packet carrying said IPv6 destination address; and
    routing said IPv6 data packet in said IPv6 domain;
wherein the IPv6 destination address is constructed by combining an IPv6 prefix and the private IPv4 address of said destination terminal in the second IPv4 domain.

2. A method of routing an IPv6 data packet resulting from a source terminal belonging to a first IPv4 domain, which first IPv4 domain is private, sending an IPv4 packet, via an IPv6 domain, to a destination terminal belonging to a second IPv4 domain, said method comprising, on reception of said IPv6 data packet:
    extracting an IPv4 data packet from said IPv6 data packet; and
    routing said extracted IPv4 data packet within the second IPv4 domain;
    wherein the source IPv6 address of the IPv6 data packet is constructed by combining an IPv6 prefix and the private IPv4 address of said source terminal in the first IPv4 domain.

3. A device for routing an IPv4 data packet sent by a source terminal belonging to a first IPv4 domain, via an IPv6 domain, to a destination terminal belonging to a second IPv4 domain, said second IPv4 domain being private, said device comprising, on reception of said IPv4 data packet from said source terminal, a processor and memory for:
    constructing an IPv6 destination address;
    encapsulating the IPv4 data packet in an IPv6 data packet carrying said IPv6 destination address; and
    routing said IPv6 data packet in said IPv6 domain;
wherein the IPv6 destination address is constructed by combining an IPv6 prefix and the private IPv4 address of said destination terminal in the second IPv4 domain.

4. The routing device according to claim 3, further comprising an interface device situated between said IPv6 domain and said first IPv4 domain, which IPv4 domain is public, said interface device being suitable for substituting the destination address of the IPv4 data packet by replacing a public IPv4 address with a private IPv4 address.

5. The routing device according to claim 3, further comprising a gateway situated between said IPv6 domain and said first IPv4 domain, which IPv4 domain is private, said gateway being suitable for substituting the destination address of the IPv4 data packet when there is IPv4 address conflict.

6. A device for routing an IPv6 data packet resulting from a source terminal belonging to a first IPv4 domain, which first IPv4 domain is private, sending an IPv4 packet, via an IPv6 domain, to a destination terminal belonging to a second IPv4 domain, said device comprising, on reception of said IPv6 data packet, a processor and memory for:
    extracting an IPv4 data packet from said IPv6 data packet; and
    routing said extracted IPv4 data packet within the second IPv4 domain;
    wherein the source IPv6 address of the IPv6 data packet is constructed by combining an IPv6 prefix and the private IPv4 address of said source terminal in the first IPv4 domain.

7. The routing device according to claim 6, further comprising an interface device situated between said IPv6 domain and said second IPv4 domain, which IPv4 domain is public, said interface device being suitable for substituting the source address of the IPv4 data packet by replacing a private IPv4 address with a public IPv4 address.

8. The routing device according to claim 6, further comprising a gateway situated between said IPv6 domain and said second IPv4 domain, which IPv4 domain is private, said gateway being suitable for substituting the source address of the IPv4 data packet when there is IPv4 address conflict.

9. A data packet routing system, comprising:
    a device according to claim 5 including a gateway connected to an interface device for routing an IPv4 data packet sent by a source terminal belonging to a first IPv4 domain, via an IPv6 domain, to a destination terminal belonging to a second IPv4 domain, said second IPv4 domain being private, said device comprising, on reception of said IPv4 data packet from said source terminal, a processor and memory for:
    constructing an IPv6 destination address;
    encapsulating the IPv4 data packet in an IPv6 data packet carrying said IPv6 destination address; and
    routing said IPv6 data packet in said IPv6 domain;
    wherein the IPv6 destination address is constructed by combining an IPv6 prefix and the private IPv4 address of said destination terminal in the second IPv4 domain; and
    wherein the interface device is situated between said IPv6 domain and said first IPv4 domain, which IPv4 domain is public, said interface device being suitable for substituting the destination address of the IPv4 data packet by replacing a public IPv4 address with a private IPv4 address, the connection to the interface device being done via an interposed network access router situated in said IPv6 domain, and in that said network access router is suitable for determining the IPv6 address corresponding to a given public IPv4 address.

10. An electronic circuit, comprising a data packet routing device according to claim 3.

11. The electronic circuit according to claim 10, further comprising a wired logic chip.

12. Data storage means that are not removable, partially removable, or completely removable, comprising computer program code instructions for implementing said means included in a data packet routing device according to claim 3.

13. A non-transitory computer readable medium having stored thereon a program executable by a microprocessor, the program being characterized in that it includes instructions for implementing said means included in a data packet routing device according to claim 3.

14. A data packet routing system, comprising:
a device according to claim 8 including a gateway connected to an interface device for routing an IPv4 data packet sent by a source terminal belonging to a first IPv4 domain, via an IPv6 domain, to a destination terminal belonging to a second IPv4 domain, said second IPv4 domain being private, said device comprising, on reception of said IPv4 data packet from said source terminal, a processor and memory for:
constructing an IPv6 destination address;
encapsulating the IPv4 data packet in an IPv6 data packet carrying said IPv6 destination address; and
routing said IPv6 data packet in said IPv6 domain;
wherein the IPv6 destination address is constructed by combining an IPv6 prefix and the private IPv4 address of said destination terminal in the second IPv4 domain; and
wherein the interface device is situated between said IPv6 domain and said first IPv4 domain, which IPv4 domain is public, said interface device being suitable for substituting the destination address of the IPv4 data packet by replacing a public IPv4 address with a private IPv4 address, the connection to the interface device being done via an interposed network access router situated in said IPv6 domain, and in that said network access router is suitable for determining the IPv6 address corresponding to a given public IPv4 address.

15. A data packet routing system, comprising:
a device according to claim 5 including a gateway connected to an interface device for routing an IPv6 data packet resulting from a source terminal belonging to a first IPv4 domain, which first IPv4 domain is private, sending an IPv4 packet, via an IPv6 domain, to a destination terminal belonging to a second IPv4 domain, said device comprising, on reception of said IPv6 data packet, processor and memory for:
extracting an IPv4 data packet from said IPv6 data packet; and
routing said extracted IPv4 data packet within the second IPv4 domain;
wherein the source IPv6 address of the IPv6 data packet is constructed by combining an IPv6 prefix and the private IPv4 address of said source terminal in the first IPv4 domain; and
wherein the interface device is situated between said IPv6 domain and said second IPv4 domain, which IPv4 domain is public, said interface device being suitable for substituting the source address of the IPv4 data packet by replacing a private IPv4 address with a public IPv4 address, the connection to the interface device being done via an interposed network access router situated in said IPv6 domain, and in that said network access router is suitable for determining the IPv6 address corresponding to a given public IPv4 address.

16. A data packet routing system, comprising:
a device according to claim 8 including a gateway connected to an interface device for routing an IPv6 data packet resulting from a source terminal belonging to a first IPv4 domain, which first IPv4 domain is private, sending an IPv4 packet, via an IPv6 domain, to a destination terminal belonging to a second IPv4 domain, said device comprising, on reception of said IPv6 data packet, a processor and memory for:
extracting an IPv4 data packet from said IPv6 data packet; and
routing said extracted IPv4 data packet within the second IPv4 domain;
wherein the source IPv6 address of the IPv6 data packet is constructed by combining an IPv6 prefix and the private IPv4 address of said source terminal in the first IPv4 domain; and
wherein the interface device is situated between said IPv6 domain and said second IPv4 domain, which IPv4 domain is public, said interface device being suitable for substituting of the source address of the IPv4 data packet by replacing a private IPv4 address with a public IPv4 address, the connection to the interface device being done via an interposed network access router situated in said IPv6 domain, and in that said network access router is suitable for determining the IPv6 address corresponding to a given public IPv4 address.

17. An electronic circuit, comprising a data packet routing device according to claim 6.

18. The electronic circuit according to claim 17 further comprising a wired logic chip.

19. Data storage that is not removable, partially removable, or completely removable, comprising computer program code instructions for implementing said data storage included in a data packet routing device according to claim 6.

20. A non-transitory computer readable medium having stored thereon a program executable by a microprocessor, the program being characterized in that it includes instructions for implementing said means included in a data packet routing device according to claim 6.

21. The method of claim 1, further comprising substituting the IPv4 destination address prior to encapsulating the IPv4 data packet.

22. The method of claim 2, further comprising substituting the IPv4 source address prior to routing said extracted IPv4 data packet within the second IPv4 domain.

23. The device of claim 3, further comprising substitutes the IPv4 destination address prior to encapsulating the IPv4 data packet in an IPv6 data packet carrying said IPv6 destination address.

24. The device of claim 6, further comprising substitutes the IPv4 source address prior to routing said extracted IPv4 data packet within the second IPv4 domain.

25. The system of claim 9, wherein the interface device substitutes the IPv4 destination address prior to encapsulating the IPv4 data packet in an IPv6 data packet carrying said IPv6 destination address.

26. The system of claim 14, wherein the interface device substitutes the IPv4 destination address prior to encapsulating the IPv4 data packet in an IPv6 data packet carrying said IPv6 destination address.

27. The system of claim 15, wherein the interface device substitutes the IPv4 source address prior to routing said extracted IPv4 data packet within the second IPv4 domain.

28. The system of claim 16, wherein the interface device substitutes the IPv4 source address prior to routing said extracted IPv4 data packet within the second IPv4 domain.

* * * * *